(12) United States Patent
Nakashima

(10) Patent No.: US 11,393,264 B1
(45) Date of Patent: Jul. 19, 2022

(54) APPARATUS AND SYSTEM FOR UTILIZING A MOBILE DEVICE IN A VEHICLE FOR NOTIFICATIONS

(71) Applicants: DENSO International America, Inc., Southfield, MI (US); Denso Corporation, Kariya (JP)

(72) Inventor: Tsuyoshi Nakashima, Novi, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 0 days.

(21) Appl. No.: 17/216,235

(22) Filed: Mar. 29, 2021

(51) Int. Cl.
| | |
|---|---|
| *G07C 5/08* | (2006.01) |
| *H04W 4/02* | (2018.01) |
| *H04W 4/029* | (2018.01) |
| *H04W 4/40* | (2018.01) |
| *G07C 5/00* | (2006.01) |
| *B60R 22/48* | (2006.01) |
| *G06Q 40/08* | (2012.01) |
| *G08G 1/01* | (2006.01) |

(52) U.S. Cl.
CPC ............ *G07C 5/0816* (2013.01); *B60R 22/48* (2013.01); *G06Q 40/08* (2013.01); *G07C 5/008* (2013.01); *G08G 1/0129* (2013.01); *H04W 4/027* (2013.01); *H04W 4/029* (2018.02); *H04W 4/40* (2018.02); *B60R 2022/4866* (2013.01)

(58) Field of Classification Search
CPC ...... G07C 5/0816; G07C 5/008; B60R 22/48; B60R 2022/4866; G06Q 40/08; G08G 1/0129; H04W 4/027; H04W 4/029; H04W 4/40
USPC ...................................................... 455/456.1
See application file for complete search history.

(56) References Cited

U.S. PATENT DOCUMENTS

| | | | |
|---|---|---|---|
| 9,527,384 B2 | 12/2016 | Bando et al. | |
| 9,928,735 B2* | 3/2018 | Wang ............... | G08G 1/096775 |
| 10,300,922 B2 | 5/2019 | Volos et al. | |
| 11,285,867 B2* | 3/2022 | Hodge ................... | G08G 1/052 |
| 2019/0028421 A1* | 1/2019 | Duchastel ............... | H04L 51/26 |
| 2020/0228646 A1* | 7/2020 | Hotes ................. | H04M 1/72454 |
| 2021/0224917 A1* | 7/2021 | Gaudin ................. | B60W 50/14 |

* cited by examiner

*Primary Examiner* — Hirdepal Singh
(74) *Attorney, Agent, or Firm* — Dickinson Wright PLLC

(57) ABSTRACT

A server in communication with a mobile device connected to a vehicle including a wireless transceiver configured to collect data from the mobile device and the vehicle, wherein the data includes accelerometer data, GPS location data, and driver historical data. The server includes a processor in communication with the transceiver. The processor is programmed to receive the accelerometer data, GPS location data, and driver historical data, define one or more rules associated with driving behavior of the vehicle, a driver of the vehicle, wherein the rules ignore violations at a first instance, determine utilizing the accelerometer data, GPS location data, and driver historical data that one or more rules have been violated by the vehicle and driver on at least a second instance, and send a notification to the mobile device, wherein the notification includes instruction to output a message indicating a violation of the rule.

20 Claims, 5 Drawing Sheets

APPARATUS AND SYSTEM FOR UTILIZING A MOBILE DEVICE IN A VEHICLE FOR NOTIFICATIONS

TECHNICAL FIELD

The present disclosure relates to vehicle computer systems, including those configured to connect to a mobile device and a remote server that is remote from the vehicle.

BACKGROUND

Traditional driver risk assessment systems may be used by insurance companies and fleet management companies to compare driver parameters with predetermined thresholds and assess driver risk based on these comparisons. Example parameters are vehicle speed and acceleration. For example, if a vehicle speed exceeds a predetermined threshold, a driver risk assessment system may reduce an assessment score of the corresponding driver. The assessment score may be provided to an insurance company and/or a fleet management company. The insurance company may adjust an insurance rate of the driver based on the assessment score. The driver may be a taxi, track or bus driver for the fleet management company and the fleet management company may adjust a pay rate of the driver based on the assessment score.

SUMMARY

According to one embodiment, a server in communication with a mobile device connected to a vehicle including a wireless transceiver configured to collect data from the mobile device and the vehicle, wherein the data includes accelerometer data, GPS location data, and driver historical data. The server includes a processor in communication with the transceiver. The processor is programmed to receive the accelerometer data, GPS location data, and driver historical data, define one or more rules associated with driving behavior of the vehicle, a driver of the vehicle, wherein the rules ignore violations at a first instance, determine utilizing the accelerometer data, GPS location data, and driver historical data that one or more rules have been violated by the vehicle and driver on at least a second instance, and send a notification to the mobile device, wherein the notification includes instruction to output a message indicating a violation of the rule.

According to a second embodiment, a server in communication with a mobile device connected to a vehicle includes a wireless transceiver configured to collect data from the mobile device and the vehicle, wherein the data includes accelerometer data, location data, and driver historical data. The server includes a processor in communication with the transceiver, the processor programmed to receive the accelerometer data, GPS location data, and driver historical data, define one or more rules associated with driving behavior of the vehicle, a driver of the vehicle, wherein the rules ignore violations at a first group of instances, wherein the first group of instances includes one or more instances, determine utilizing the accelerometer data, GPS location data, and driver historical data that one or more rules have been violated by the vehicle and driver on at least a second group of instances associated with a geo-location, wherein the second group of instances include more instances than the first group of instances, and in response to the determination that one or more rules have been violated on at least the second group of instances, send a notification to the mobile device, wherein the notification includes instruction to output a message to the driver indicating a violation of the rule.

According to a third embodiment, a mobile phone in communication with a server and connected to a vehicle, comprising a wireless transceiver configured to collect data from the server and the vehicle, wherein the data includes accelerometer data, location data, and driver historical data based on a previous trip, and a processor in communication with the transceiver. The processor is programmed to send to the remote server the accelerometer data and GPS location data via the wireless transceiver, and output a notification in response to a determination at the server that one or more driving rules have been violated utilizing the accelerometer data, GPS location data, and driver historical data based on a previous trip, wherein the notification includes instructions to output a message to the driver indicating a violation of the rule.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure relates to a system that may obtain driving habits of a vehicle user via a mobile device. The system may then alert the user (e.g., by nudging or notification) to behave in a certain way based on the driving habits. The driving habits may be obtained based on historic and statistical data of the user's past driving events, including acceleration events, speed violations, and/or violations at stop signs. For example, if the driving habits indicate that the user did not fasten the seatbelt while driving above a certain speed during a previous trip, the system may alert the user to fasten the seatbelt before the user starts a new trip. In another example, if the driving habits show that the user did not stop at a stop sign during a previous trip, the system may alert the user to prepare to stop at an upcoming stop sign during a new trip. The system may further score the driving habits of the user and/or compare the user's driving habits with the driving habits of other users.

Figure 1:
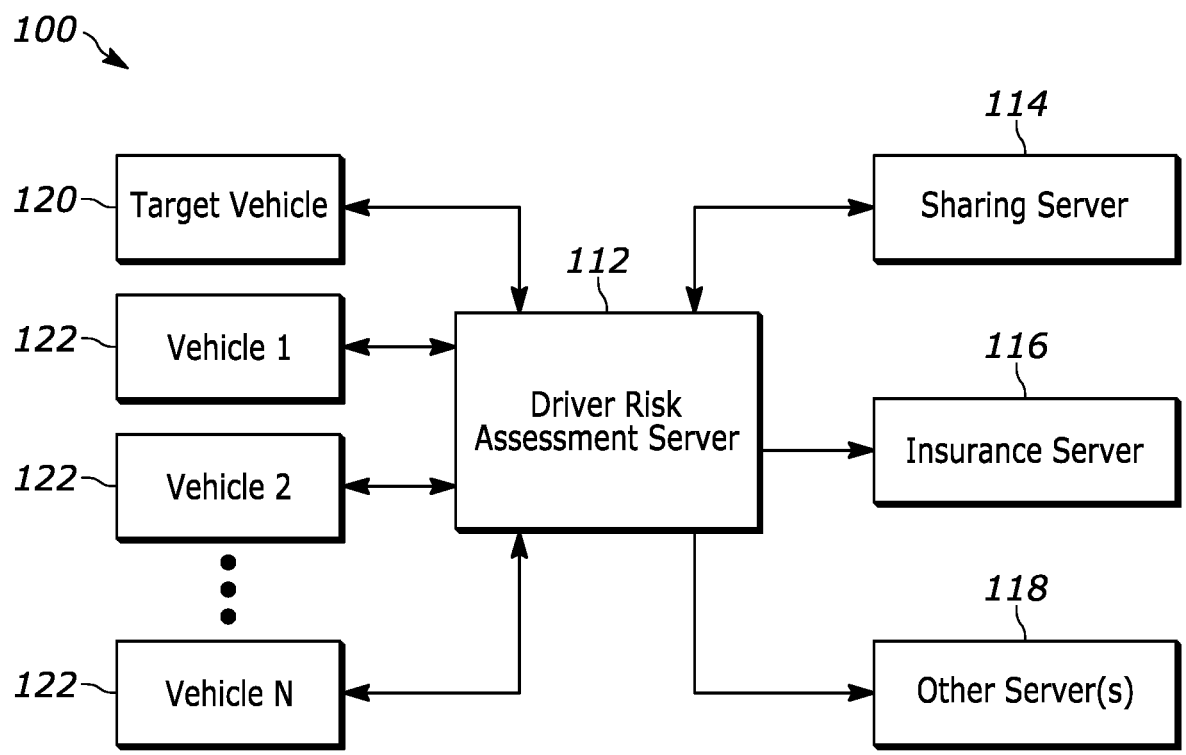
FIG. 1 illustrates a driver risk assessment system.

FIG. 1 illustrates a driver risk assessment system 110 that includes vehicles, a risk assessment server 112, a sharing server 114, an insurance server 116 and one or more other servers 118. Although not shown, communication between the servers 112, 114, 116, 118 and the vehicles 120, 122 may be via base stations, satellites, gateways, switches, and/or other intermediary communication devices. The vehicles may include a target vehicle 120 and other vehicles 122. Any one of the vehicles 120, 122 may be a target vehicle. A target vehicle refers to a vehicle including a driver for which driving behavior is being monitored and evaluated for risk assessment via the driver risk assessment server 112. The other servers may include, for example, a fleet management server and/or other third party servers. The vehicles may communicate various information including parameters, features, etc. describing behavior of the vehicles to the driver risk assessment server 112, which may then provide feedback to the vehicles 120, 122 and/or provide risk assessment scores and/or other driving behavior related information to the servers 114, 116, 118. The feedback may include the driver behavior related information. A feature may refer to, for example, a range (e.g., 60-70 km/hr) of a parameter (e.g., vehicle speed) or a certain behavior (e.g., braking, increasing speed, turning at a certain steering angle, etc.). The vehicles 120, 122 may perform various tasks based on the feedback including reporting the assessment scores to the drivers, altering autonomous vehicle operation, training the drivers how to operate the vehicles 120, 122 in certain locations, etc.

The sharing server 114 (or "cloud") may store information and data. The sharing server 114 may store the information received from the vehicles 120, 122; the risk assessment scores; and/or other data pertaining to the vehicles 120, 122, the drivers of the vehicles 120, 122, locations through which the vehicles 120, 122 are driving, and/or conditions of the locations. The insurance server 116 may receive the risk assessment scores of the vehicles 120, 122. Furthermore, and adjust insurance rates for the drivers of the vehicles 120, 122. The other server(s) 18 may adjust pay rates and/or other benefits of the drivers based on the risk assessment scores. Operations of the servers 112, 114, 116, 118 and the vehicles 120, 122 are further described below.

Figure 2:
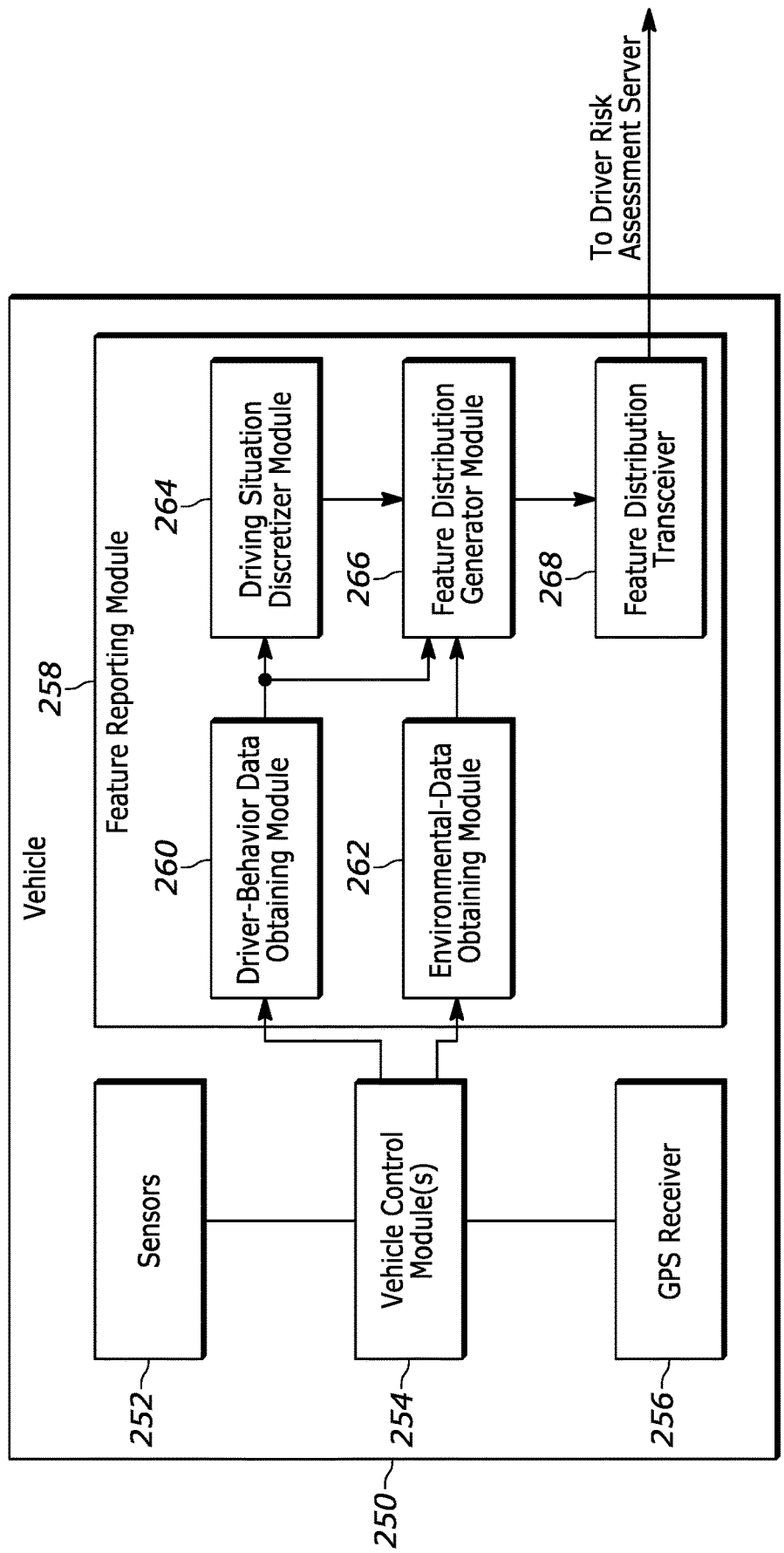
FIG. 2 illustrates an example of one of the vehicles with various components and modules.

FIG. 2 shows an example of one of the vehicles 20, 22 of FIG. 1. The vehicle, designated 250, includes sensors 252, vehicle controller 254, a global positioning system (GPS) receiver 56 and a feature reporting module 258. The feature reporting module 258 may be separate from the vehicle controller 254, as shown, or may be implemented as one of the vehicle controller 254. The feature reporting module 258 includes a driver-behavior data obtaining module 260, an environmental-data obtaining module 262, a driving situation discretizer module 264, a feature distribution generator module 66 and a feature distribution transceiver 268.

The sensors 252 may include a first type of sensors each measuring a current quantity or a current state of operation of a corresponding one of driver-operable devices (e.g., a brake pedal, a gas pedal, a steering wheel, a signal indicator, etc.) installed in the vehicle. The first type of sensors output time-series driving data sequences consisting of sequentially or cyclically measured data indicative of how the operated quantity or the operated condition of a corresponding one of the driver-operable devices changes. For example, the first type of sensors includes an accelerator sensor, a brake sensor, a steering sensor, indicator sensors, a shift-position sensor and/or other sensors. The accelerator sensor provides an output indicative of a position of a gas pedal of the vehicle and/or an acceleration rate of the vehicle. The brake sensor provides an output indicative of a position of a brake pedal, an applied pressure on a brake pedal, and/or a percentage of a total available amount of braking of the vehicle. The steering sensor provides an output indicative of a steering angle of a steering wheel of the vehicle. The indicator sensors provide outputs indicative of, for example, operation of turning signals on the vehicle. The shift position sensor provides an output indicative of a driver-selectable position of a transmission of the vehicle. Other sensors may be utilized, such as a seat belt sensor that indicates whether a seat belt is engaged or not. Additionally, an occupant sensor or weight sensor that may indicate whether an occupant is in a seat.

The sensors 252 also include a second type of sensors each measuring a parameter indicative of how a behavior of the vehicle changes and outputting a time-series measurement data sequence. For example, the second type of sensors may include a vehicle speed sensor, a yaw-rate sensor, image sensors (e.g., cameras), ultrasonic sensors, radar sensors, LiDAR sensors, etc. The vehicle speed sensor provides an output indicative of a speed of the vehicle. The yaw-rate sensor provides an output indicative of an angular velocity, such as a yaw rate around a vertical axis of the vehicle. The image sensors may provide images of an environment around the vehicle 250. The radar sensors may measure positions of objects located around the vehicle 250 and/or relative speeds of the object relative to the vehicle. The second type of sensors may also include an interior measurement unit (IMU) that repeatedly measures 3-axis (i.e. three-dimensional angular velocities and acceleration values) using gyro sensors and/or accelerometers. The sensors 252 may further be used to detect and/or determine a time zone, a date, weather conditions, and states of infrastructures located around the vehicle.

The time-series measurement data sequences of the second type of sensors represent how the behavior of the vehicle changes based on driver operations of the driver-operable devices. The time-series measurement data sequences output from the second type of sensors will be referred to as time-series behavior-data sequences. The data may thus be time stamped utilizing the sensors in the vehicle or other components.

The driving-behavior data obtaining module 260 receives the time-series driving-data sequences and the time-series behavior-data sequences from the sensors 252. This may be via one or more of the vehicle control modules 254. The driving-behavior data obtaining module 260 differentiates the time-series driving-data sequences to generate first differential data sequences. Additionally, the driving-behavior data obtaining module 260 differentiates the time-series behavior-data sequences to generate second differential data sequences. Then, the driving-behavior data obtaining module 260 groups the time-series driving-data sequences, the time-series behavior-data sequences, the first differential data sequences, and the second differential data sequences to generate multidimensional time-series data sequences. The driving-behavior data obtaining module 260 outputs, as driving behavioral data sequences, the multidimensional time-series data sequences to each of the modules 264, 266.

The environmental-data obtaining module 262 may also receive outputs of the sensors. This may be via one or more of the vehicle control modules 254, as shown. The environmental-data obtaining module 262 is connected to the GPS receiver 256, which receives signals sent from GPS satellites and generates three-dimensional positional information based on the received signals. The GPS receiver 256 outputs a time-series positional data sequence including the three-dimensional positional information. The environmental-data obtaining module 262 may receive: the time-series image data sequence; the time-series position-data sequence; the time-series relative-speed data sequence; the time-series 3D angular-velocity data sequence; the time-series acceleration-data sequence; the time-series time-zone data sequence; the time-series weather-data sequence; and the time-series infrastructural-data sequence. These data sequences represent driving environments of the vehicle. The environmental-data obtaining module 262 outputs the data sequences to the feature distribution generator module 66 as environmental data sequences.

The driving situation discretizer module 264 stores a driver model that simulates driving operations of drivers and recognition operations of the environments around each driver. The driving situation discretizer module 264 statistically analyzes the driving behavioral data sequences output from the driving-behavior data obtaining module 260. This statistic analysis extracts each point of time where a common driver feels a change from a current driving situation to another driving situation. The driving situations represent driving conditions and environments of a vehicle. For example, each of the driving situations represents various items of information indicative of how the driver drives a vehicle in certain environments.

According to the results of extraction, the driving situation discretizer module 264 discretizes the driving behavioral data sequences into segmented behavior-data sequences; where each of the segmented behavior-data sequences corresponds to one of the driving situations. The driving situation discretizer module 264 extracts sequence of time sections, each of which matching with a corresponding one of the segmented behavior-data sequences.

The feature distribution generator module 266 generates a distribution of feature quantities included in each of the segmented behavior-data sequences experienced in each of the driving situations. Similarly, the feature distribution generator module 266 generates a distribution of feature quantities experienced in each of the environmental data sequences output from the environmental-data obtaining module 262 for each of the driving situations. For example, each of the segmented behavior-data sequences may include: a first feature quantity sequence FQ1, which is indicative of a position of a driver-operable gas pedal; a second feature quantity sequence FQ2, which is indicative of a position of a driver-operable brake pedal; a third feature quantity sequence FQ3, which is indicative of a position of a steering wheel; a fourth feature quantity sequence FQ4, which is indicative of a velocity of the vehicle; fifth to seventh feature quantity sequences FQ5 to FQ7, each of which is the sequence of differential quantities of a corresponding one of the first to third feature quantity sequences FQ1 to FQ3; and an eighth feature quantity sequence FQ8, which is the sequence of differential quantities of the fourth feature quantity sequence FQ4. Each of the segmented behavior-data sequences may include sequences for the other parameters and/or features disclosed herein. Each of the first to eighth feature quantity sequences FQ1 to FQ8 has a corresponding range with low and high limits.

The feature distribution generator module 266 uses the ranges of the segmented behavior-data sequences as a corresponding feature space, and generates a distribution for each feature quantity in a corresponding one of the feature spaces. The feature distribution generator module 266 also generates a distribution of feature quantities included in each of the environmental data sequences for each of the driving situations. The feature distribution generator module 266 divides the measured images constituting the time-series image data sequence for each of the driving situations, thus obtaining segmented images corresponding to each of the driving situations.

The feature distribution generator module 266 uses, as target feature quantities, scale-invariant feature transform (SIFT) quantities included in the segmented images for each of the driving situations. The feature distribution generator module 266 obtains SIFT quantities in each local region in each of compressed image as a feature quantity. The feature distribution generator module 66 uses the range of the SIFT quantities as a feature space and generates a distribution of the SIFT quantities in the feature space. The feature distribution generator module 266 generates a bar for each of predetermined bins; the height of the bar for each of the predetermined bins represents the frequency of corresponding some of the SIFT quantities. This generates a distribution of the SIFT quantities as a histogram. The predetermined bins may be determined based on learning. The feature distribution generator module 266 can use other feature quantities in place of the SIFT quantities. Accordingly, these operations of the feature distribution generator module 266 generate a group of feature-quantity distributions for each of the driving situations; the group of the feature-quantity distributions for each of the driving situations includes: a first type of feature-quantity distributions based on the segmented behavior-data sequences for a corresponding one of the driving situations; and a second type of feature-quantity distributions based on the time-series environmental data sequences for a corresponding one of the driving situations.

As an example, the number of the first and second types of feature-quantity distributions included in each of the driving situations may be set to n, where n is an integer equal to or more than 2. The n feature-quantity distributions included in each of the driving situations can be referred to as the first feature-quantity distribution (first distribution) 1, . . . , to the n-th feature-quantity distribution (n-th distribution) n.

First, the modules 260, 262, 264, 266 are operating while the vehicle is travelling. These operations generate learning first to n-th feature-quantity distributions for each of the driving situations; the learning first to n-th feature-quantity distributions for each of the driving situations are correlated with corresponding learning images for a corresponding one of the driving situations. The feature distribution transceiver 268 transmits the group of feature-quantity distributions to the one or more servers shown in FIG. 1.

Figure 3:
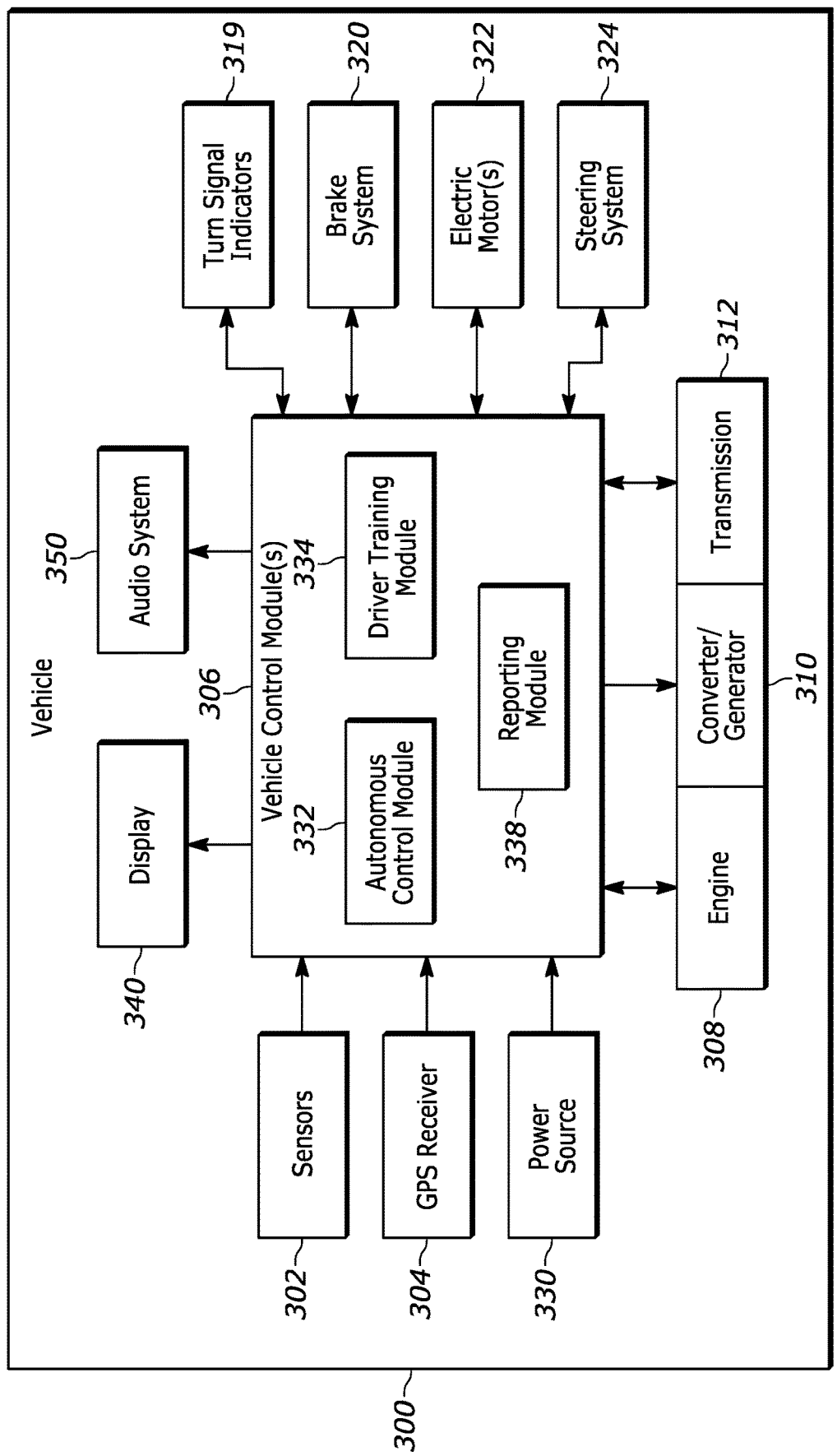
FIG. 3 illustrates a vehicle including various sensors.

FIG. 3 shows a vehicle 300 including sensors 302, a GPS receiver 304, vehicle control modules 306, an engine 308, a converter/generator 310, and a transmission 312. The vehicle 300 may be implemented as one of the vehicles 20, 22 of FIG. 1. The sensors 302 detect environmental conditions and status of vehicle devices. The sensors 302 may include those sensors 252 of FIG. 2. The GPS receiver 304 may operate similar as the GPS receiver 256 of FIG. 2.

The vehicle controller 306 may include engine, converter/generator, transmission, brake, steering, electric motor control controllers and/or processors (including microprocessors) or modules that control operation of the engine 308, the converter/generator 310, the transmission 312, turn signal indicators 319, a brake system 320, one or more electric motor(s) 322, and steering system 324. The engine 308, the converter/generator 310, the transmission 312, the turn signal indicators 319, the brake system 320, the electric motor(s) 322, and the steering system 324 may include actuators controlled by the vehicle controller 306 to, for example, adjust fuel, spark, air flow, throttle position, pedal position, etc. This control may be based on the outputs of the sensors 302, the GPS receiver 304, and a remote server. The feedback may include a risk assessment score for a driver of the vehicle 300. The vehicle controller 306 may receive power from a power source 330, which may be provided to the engine 308, the converter/generator 310, the transmission 312, the turn signal indicators 319, the brake system 320, the electric motor(s) 322, the steering system 324, etc. The other control modules (e.g., controllers) of the vehicle control modules 306 may include an autonomous control module 332, a driver training module 334, and a reporting module 338.

The autonomous controller 332 may control operation of the engine 308, the converter/generator 310, the transmission 312, the turn signal indicators 319, a brake system 320, one or more electric motor(s) 322, and steering system 324 based on average and/or trend driver behavior for locations and conditions. The vehicle 300 may or may not include an autonomous controller 332. Average and/or trend driver behavior information may be provided by the various servers to the vehicle control modules 306. This may be done via transceivers of the vehicle 300 and the one or more servers.

As an example, in a certain location and under a certain set of driving conditions, a typical (or average) driver may drive at a certain speed, accelerate at a certain rate, exhibit a certain brake and/or steering pattern, use a certain turn signal, set a certain cruising speed, etc. This and other average driver behavior information may be provided as driving parameters and patterns to each of the vehicle control modules 306, which may then perform tasks based on this information. The average driver behavior information may also include anomaly information and/or anomaly outliers to indicate where potential dangerous conditions exist. Anomaly information and anomaly outliers may be used to identify locations where drivers on average are operating their vehicles more dangerously or differently than under the current driving conditions due to a dangerous situation (e.g., a vehicle accident, an icy road, a down tree or powerline, an inanimate or animate object in a lane of traffic, etc.). An average driver may swerve a corresponding vehicle at a certain location to prevent an accident from occurring. This is an indication of a dangerous location. As another example, the driver of the vehicle 300 may operate the vehicle 300 more dangerously than other drivers at a certain location. As a result, the vehicle control modules 306 may respond to this by changing operation of the engine 308, the converter/generator 310, the transmission 312, the turn signal indicators 319, the brake system 320, the electric motor(s) 322 and/or the steering system 324 and/or by generating, for example, video and/or audio signals via the display 340 and the audio system 350. This may be done in an attempt to alter the behavior of the driver to be similar to that of an average driver.

The autonomous controller 332 may, for example, control operation of the engine 308, the converter/generator 310, the transmission 312, a brake system 320, one or more electric motor(s) 322, and steering system 324, such that the vehicle 300 exhibits these driving parameters and/or follows the provided driving patterns for the current location of the vehicle 300 and driving conditions. This causes the vehicle to operate as a vehicle operated by an average driver for that location and driving conditions. This control may also be based on the anomaly information and/or anomaly outliers.

The driver training module 334 may indicate via a display 340 how to operate the vehicle 300 to a driver to train the driver to act in a similar manner as other typical drivers for that location and driving conditions. The driver training module 334 may receive driving parameters and/or patterns from the remote server and may then display these parameters and/or patterns on the display 340. For example, prior to entering a location and/or while in the location, the driver training module 334 may display steering indicators, braking indicators, gas pedal indicators, turn signal indicators, driving path indicators, etc. to a driver to influence the driver to act in a certain manner for the current location of the vehicle 300 and driving conditions. The actions performed by the driver training module 334 may also be based on anomaly information and/or anomaly outliers. The driver training module 334 generator indicators via the display 340 and/or the audio system 350 to indicate to the driver that the driver is driving dangerously and/or appears to be driving impaired and provide indicators to aid the driver to drive more safely. In one embodiment, one of the controllers 332, 334 may perform countermeasures to avoid an accident by controlling operations of the vehicle 300 should the driver be impaired. This may include limiting speed of the vehicle, reducing speed of the vehicle, maintaining predetermined distances from objects, etc.

The reporting module 338 may display a risk assessment score of the driver as received from the remote server, an updated insurance rate, an updated pay rate, and/or other related information. This may be done via the display 340.

Figure 4:
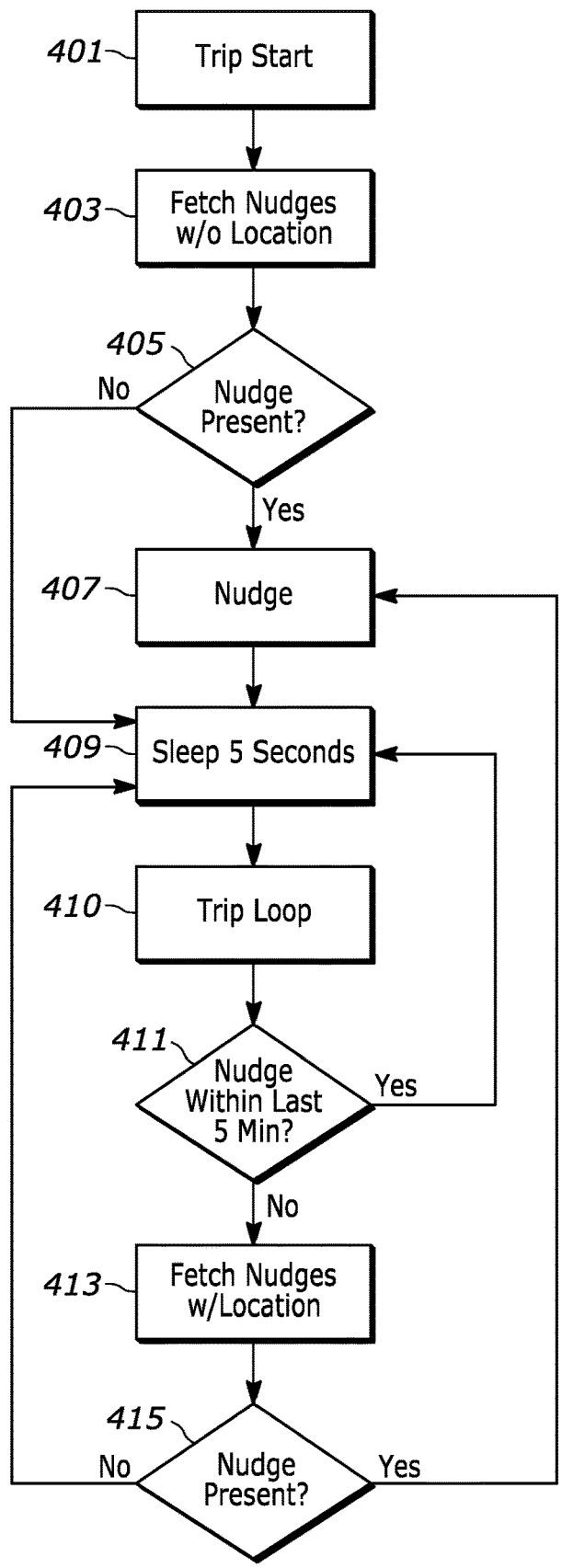
FIG. 4 is a flowchart in determining a nudge utilizing a historical data.

FIG. 4 is a flowchart in determining a nudge utilizing a historical data. The steps and flow may occur at the vehicle via a multimedia system, mobile device (or any other device), or at a remote server, or any combination thereto. For example, some steps may be processed at the vehicle while other steps may be performed at the cloud. At step 401, the system may receive information that a trip has begun. The mobile device may be in communication with the vehicle computer system. The mobile device may retrieve from the vehicle computer system different data related to the vehicle in order to send to a remote server. The data may include vehicle data related to the vehicle location (e.g., from GPS systems), vehicle speed (e.g., from vehicle speed sensor), map information from an on-board map database (e.g., road data, speed limit information, etc.).

At step 403, the system may retrieve the nudges that are associated with a driver of the vehicle but do not contain location information. Thus, the nudges may be associated with a driver and not the vehicle given that the mobile device may be the gate keeper between the driving data (e.g., not vehicle dependent) and the nudges. Such nudges without a location may not require GPS information to notify the driver of a rule violation to initiate a nudge. For example, a seatbelt violation may occur if data indicates that a seat belt is not worn and an occupant is in a seat, yet the vehicle speed is traveling over a threshold speed.

At decision 405, the system may determine if a nudge is present. Thus, the system may compare the driving data to the rules to determine if a nudge is necessary to be output to a driver at the vehicle. The processing may be done on-board at the vehicle, or via the remote server based on the data sent to the server. If a nudge is not present, the system may sleep for a time threshold (e.g., five seconds) at step 409. The system may then begin to collect data after the time threshold (e.g., after the five seconds elapses) to determine if a nudge should occur.

If the nudge is present, the system may output a nudge at step 407. The nudge may be sent from the server based on an instruction to the mobile device to start a nudge. The nudge may be a graphical notification presented at the mobile device or the vehicle computer system. The nudge may also be an audible notification presented at the mobile device or the vehicle computer system, based on text to speech information included in the nudge. The nudge may include information as to what caused the rule violation, such as failing to wear a seatbelt or disobeying another type of traffic violation.

At step 409, the system may collect data and sleep for a threshold time, such as five seconds. Thus, the system may only collect, gather, and send data from the vehicle to the server via the mobile device every five seconds. Likewise, the system may check for nudges or output nudges every threshold time (e.g., five seconds). The sleep threshold for time may be adjusted and may be any number of seconds. Thus, the system may utilize a threshold refresh time to identify nudges and rule violations, as well as sending data to the server. The faster the system may send and retrieve data from the vehicle and server, the faster the refresh rate is at step 409.

At step 410, the system may begin a trip loop upon completion or lapsing of the time threshold to refresh data. Thus, while the vehicle is being driven, the server and vehicle may communicate data back and forth at the refresh period (e.g., five seconds). If the system has slept and not collected the data, it will then ping the vehicle for data to determine if a nudge is present based on a rule violation.

At step 411, the system may determine if there was a nudge within a nudge time threshold (e.g., five minutes). The nudge time threshold may be any time period. Thus, the system may be programmed to avoid repeating nudges to various users, which may be annoying to a driver or occupant of the vehicle. If the system determines that a nudge has occurred within the threshold time period, the system may simply sleep and continue to collect data after sleeping, as shown at step 409. However, if there is not a nudge within the last time threshold (e.g., five minutes), the system may continue to determine if a nudge is present based on the data that is collected.

At step 413, the system may fetch the nudge information (e.g., vehicle data or map data data) with location data. Thus, the data collected from the vehicle via the mobile device may include GPS location data or other types of location data. In one embodiment, the nudges may be associated with a driver and not the vehicle given that the mobile device may be the gate keeper between the driving data (e.g., not vehicle dependent) and the nudges. In another embodiment, the nudges may be vehicle dependent. Such nudges with a location may require GPS information to notify the driver of a rule violation to initiate a nudge. For example, a speed violation may occur if data indicates that driver speed has exceeded a speed limit, yet the vehicle speed is traveling over a threshold speed. Stop sign violations and lane changing violations may also be utilized based on the location data.

At step 415, the system may determine if a nudge that includes location information is present and should be output in response to a rule violation. The nudge may be sent from the server based on an instruction to the mobile device to start a nudge. The nudge may be a graphical notification presented at the mobile device or the vehicle computer system. The nudge may also be an audible notification presented at the mobile device or the vehicle computer system, based on text to speech information included in the nudge. The nudge may include information as to what caused the rule violation, such as failing to stop at a stop sign, speeding, or disobeying another type of traffic violation. If the nudge is present, it may output the nudge at 407. If the nudge is not present, the system may continue to sleep at step 409.

The nudge or notification may include various data. In one scenario, the nudge may include a time stamp indicating when the rule violation occurred or when it was sent to the vehicle. It also may include information and data indicating geo-location information of the occurrence (e.g., latitude and longitude), the primary type of rule violation that occurred (e.g., seatbelt violation, speed limit violation, etc.). The system may also include a secondary type of data included, which may indicate historical data of the violation at that area or statistical data (e.g., where the user's violation percentile distribution is with respect to other users). The nudge may also include information associated with a text to speech message. The text to speech message may include information to be output at the vehicle, including at the vehicle speakers, to indicate a type of violation that occurred to initiate the nudge or notification.

The system may also determine a nudge utilizing statical data. In such a scenario, the system may utilize crowd-sourced data to determine if a nudge may be useful or not in a present location. The system may look at a group of instances or occurrences that a violation has occurred. The system may ignore rule violations (and therefore sending nudges or notifications) for a threshold amount of violations at a certain amount of instances (e.g., violations, trips, car starts, etc.) However, if the violations exceed a number of instances or threshold for violations, the system may send the notification or nudge to the user. For example, if it is common that a user drives over 5 MPH in a certain location based on historic data, the system may not nudge a user. However, if a driver breaks a rule that may only apply to a certain threshold of drivers based on their percentile of driver behavior. For example, the system may be utilized to calculate the total number of kilometers or miles each driver drove that exceeded the speed limit by 10 MPH. The system may then find a percentile score for each driver based on peer comparison. For example, the system may look to see how your driving habits compare to others. The system may provide a scale that goes from 1.0 for those who never speed, and a 0.0 for those who speed at all times. The system may provide a notification or nudge for each driver below a certain threshold score. For example, the system may be configured to only nudge a driver if their threshold score is below 0.40. In another example, the system may be configured to only nudge a driver if their threshold score is below 0.25. Thus, such information may be presented to nudge users only when they are driving much worse than peers, as certain environment conditions may cause behavior recognized as "bad" without statistical comparisons. For example, in a situation where construction is being done and the speed limit is lowered, the system may provide notifications of nudges for each user without a statistical comparison. In another example, the system may nudge a driver when the driver goes 10% of limit if the percentile distribution is within the bottom 40% among active users. The system may also nudge (e.g., output a notification indicating a rule violation or a tip) a driver before you enter a stop sign if the percentile distribution is within the bottom 40% of active users. The system may also output a grade (e.g., A, B, C, D, E+/−) as associated with the percentile ranking to notify the driver of their habits grade. In another embodiment, the system may offer tips to correct issues with the driving behavior that may help improve the grade.

Figure 5:
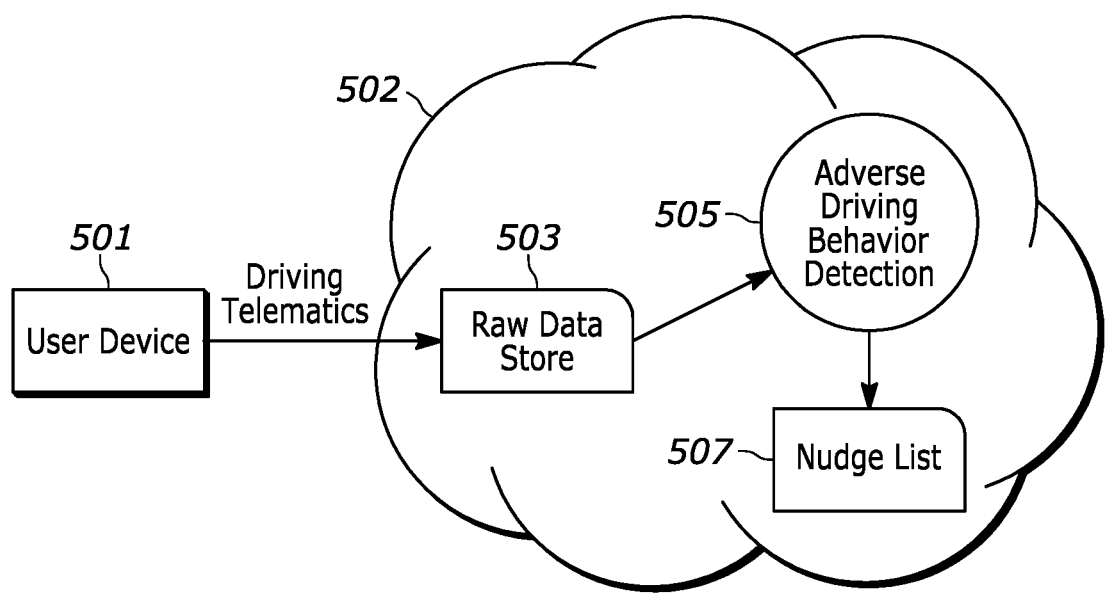
FIG. 5 includes a system overview and flow of a nudge (e.g., notification of a driver rule violation).

FIG. 5 is an illustration of another flowchart of an embodiment of the mobile device sending data to the cloud. The user device 501 may be the mobile phone or other mobile device (e.g., tablet, laptop, etc.) or telematics unit of the vehicle. The user device 501 may send the data to the cloud 502, which may be a remote server with capabilities in analyzing the driving telematics features. The server or cloud 502 may store the raw data 503 that is collected from the information sent from the vehicle via the user device 501.

The system may analyze the speed of the vehicle, the stopping patterns when approached by a stop sign, seat belt usage, distracted driving, and lane changes via a program, code, or other means to identify adverse driving behavior detection 505 utilizing the raw data store 503. Thus, the cloud 502 may analyze the raw data based on time stamps to determine adverse driving behavior 505. The adverse driving behavior 505 With respect to speed nudges, the server may receive the speed limit information associated with a road or segment from a third-party server or map database information sent via the device 501. If speed exceeds limit by a certain speed threshold, the system may create the nudge to be sent to the user device and output to the driver. In a scenario with a stop sign, the system may receive stop sign location information from a third party or map database information sent via the device 501. The system may determine where the stop sign intersect with a user's path. If the user does not come to a complete stop, the system may create the nudge to be sent to the user device and output to the driver.

In a scenario with a seat belt warning, the cloud 502 may retrieve seat belt usage information from a CAN bus of the vehicle that is sent via the user device 501. If vehicle is in motion and seat belt alarm is set, the system may create a nudge to be sent to the user device and output to the driver. In a scenario to identify a distracted driver, the system may use an accelerometer or phone operating system (e.g., that include APIs (application program interface)) to determine if the phone is in use while the vehicle is in motion or stopped and create nudge. In a scenario to identify sporadic or odd lane changes of the vehicle, the system may utilize the accelerometer data of a phone to detect how frequently a driver changes lane. If more frequent than an average of all drivers (e.g., utilizing crowd-source data of lane changes for a road or segment the system may create a nudge to be sent to the user device and output to the driver. The cloud 502 may also store a nudge list 507 that includes a list of all rule violations and nudges (e.g., notifications) that can be or will be output to the driver of the vehicle. Thus, the nudge list 507 may include an option to ignore specific nudges or may be programmed to be sent to the user device 501 to be output at the vehicle. The nudge list 507 may be utilized for the historical data and later utilized to be crowd-sourced for all of the statistical type nudges.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A server in communication with a mobile device connected to a vehicle, comprising:
a wireless transceiver configured to collect data from the mobile device and the vehicle, wherein the data includes accelerometer data, GPS location data, and driver historical data;
a processor in communication with the transceiver, the processor programmed to:
receive the accelerometer data, GPS location data, and driver historical data;
define one or more rules associated with driving behavior of the vehicle, a driver of the vehicle, wherein the rules ignore violations at a first instance;
determine utilizing the accelerometer data, GPS location data, and driver historical data that one or more rules have been violated by the vehicle and driver on at least a second instance; and
send a notification to the mobile device, wherein the notification includes instruction to output a message indicating a violation of the rule.

2. The server of claim 1, wherein the rule indicates a comparison of a speed limit indicator of a map database to a vehicle speed associated with the accelerometer data of the mobile device, and ignore sending the notification in response to the vehicle speed exceeding the speed limit indicator of the map database on only the first instance, wherein the map database is located on the server.

3. The server of claim 2, wherein the rule indicates a comparison of the speed limit indicator of a map database to a vehicle speed associated with the accelerometer data of the mobile device, and send the notification in response to the vehicle speed exceeding the speed limit indicator of the map database on at least the second instance.

4. The server of claim 1, wherein the notification includes instruction to output the message indicating the violation of the rule associated with a lane change frequency of the driver.

5. The server of claim 1, wherein the processor is further configured to compare rule violations of the driver for a driving segment to all drivers of the driving segment.

6. The server of claim 5, wherein the processor is further programmed to output a notification in response to a driver percentile being lower than a historic driver threshold of other drivers for the comparison of rule violations.

7. The server of claim 1, wherein the processor is further programmed to output the notification prior to GPS location data indicating a location associated with an area of a previous rule violation.

8. The server of claim 1, wherein the data includes seat belt data, wherein the processor is further programmed to receive the seat belt data, and in response to the seat belt data indicating an occupant is not utilizing a seat belt, sending a seat-belt notification to the mobile device.

9. A server in communication with a mobile device connected to a vehicle, comprising:
- a wireless transceiver configured to collect data from the mobile device and the vehicle, wherein the data includes accelerometer data, location data, and driver historical data;
- a processor in communication with the transceiver, the processor programmed to:
- receive the accelerometer data, GPS location data, and driver historical data;
- define one or more rules associated with driving behavior of the vehicle, a driver of the vehicle, wherein the rules ignore violations at a first group of instances, wherein the first group of instances includes one or more instances;
- determine utilizing the accelerometer data, GPS location data, and driver historical data that one or more rules have been violated by the vehicle and driver on at least a second group of instances associated with a geo-location, wherein the second group of instances include more instances than the first group of instances; and
- in response to the determination that one or more rules have been violated on at least the second group of instances, send a notification to the mobile device, wherein the notification includes instruction to output a message to the driver indicating a violation of the rule.

10. The server of claim 9, wherein the first group of instances includes only one instance associated with driving behavior or only two instances associated with driving behavior associated with the geo-location.

11. The server of claim 10, wherein the server is configured to store every violation of the rule associated with the mobile device.

12. The server of claim 10, wherein the notification is sent to the mobile device in response to a driver's percentile distribution being within a certain percentage range among a group of drivers.

13. The server of claim 10, wherein the data includes seat belt data, wherein the processor is further programmed to receive the seat belt data; and in response to the seat belt data indicating an occupant is not utilizing a seat belt, sending a seat-belt notification to the mobile device.

14. The server of claim 10, wherein the data includes seat belt data, wherein the processor is further programmed to receive the seat belt data, and output a notification upon start of a trip of the vehicle in response to a previous trip indicating excess speeding and the seat belt data indicating an occupant not utilizing a seat belt in the previous trip.

15. A mobile phone in communication with a server and connected to a vehicle, comprising:
- a wireless transceiver configured to collect data from the server and the vehicle, wherein the data includes accelerometer data, location data, and driver historical data based on a previous trip;
- a processor in communication with the transceiver, the processor programmed to:
- send to the server the accelerometer data and GPS location data via the wireless transceiver; and
- output a notification in response to a determination at the server that one or more driving rules have been violated at a second group of instances utilizing the accelerometer data, GPS location data, and driver historical data based on a previous trip, wherein the notification includes instructions to output a message to the driver indicating a violation of the rule,
- wherein the violation of the rule ignores violations associated at a first group of instances that includes one or more instances,
- wherein the second group of instances include more instances than the first group of instances.

16. The mobile phone of claim 15, wherein the processor is programmed to send the accelerometer data and the GPS location data at a reoccurring time period when connected to the vehicle.

17. The mobile phone of claim 15, wherein the accelerometer data and GPS location data are based on a current trip of the vehicle.

18. The mobile phone of claim 15, wherein the notification includes instructions to output a message to the driver indicating a violation of the rule associated with lane changing in response to the accelerometer data.

19. The mobile phone of claim 15, wherein the notification includes instructions to output a message to the driver indicating a violation of the rule associated with stopping in response to the accelerometer data and GPS location data.

20. The mobile phone of claim 15, wherein the notification includes a text to speech message and a time stamp.

* * * * *